United States Patent
Park et al.

(10) Patent No.: US 6,593,401 B1
(45) Date of Patent: Jul. 15, 2003

(54) LOW TEMPERATURE CURABLE EPOXY RESIN, METHOD FOR PREPARING THE SAME, AND PAINT COMPOSITE USING THE SAME

(75) Inventors: Chongsoo Park, Kwangmyung (KR); Jinseon Yu, Incheon (KR); Youngsoo Park, Seoul (KR); Jinwoo Kim, Kwangmyung (KR)

(73) Assignee: Kukdo Chemical Co., Ltd., Seoul (KR)

( * ) Notice: Subject to any disclaimer, the term of this patent is extended or adjusted under 35 U.S.C. 154(b) by 0 days.

(21) Appl. No.: 10/138,406

(22) Filed: May 6, 2002

(30) Foreign Application Priority Data

Dec. 19, 2001 (KR) ..................................... 2001-0081150

(51) Int. Cl.$^7$ ............................. C08K 3/10; C08L 63/02
(52) U.S. Cl. ....................... 523/458; 525/438; 525/449; 525/471; 525/523
(58) Field of Search .......................... 523/458; 525/438, 525/449, 471, 523

(56) References Cited

U.S. PATENT DOCUMENTS 4,623,701 A * 11/1986 Massingill .................. 525/523

* cited by examiner

Primary Examiner—Robert Dawson
Assistant Examiner—D. Aylward
(74) Attorney, Agent, or Firm—Bacon & Thomas

(57) ABSTRACT

The present invention relates to a powder coating composition containing a low temperature curable epoxy resin, and more particularly to a powder coating composition containing a low temperature curable epoxy resin, which can be readily cured at a low temperature, thereby capable of being applied to coating objects that are noneconomical in terms of workability at an elevated temperature, or are thermally sensitive. The present invention provides a powder coating composition comprising 100 parts by weight of a low temperature curable epoxy resin; 30 to 500 parts by weight of a bisphenol-A curing agent or a polyester curing agent; 0.1 to 20 parts by weight of a defoaming agent; and 0.1 to 20 parts by weight of a leveling agent.

5 Claims, 1 Drawing Sheet

LOW TEMPERATURE CURABLE EPOXY RESIN, METHOD FOR PREPARING THE SAME, AND PAINT COMPOSITE USING THE SAME

BACKGROUND OF THE INVENTION

1. Field of the Invention

The present invention relates to a powder coating composition containing a low temperature curable epoxy resin, and more particularly to a powder coating composition containing a low temperature curable epoxy resin, which can be readily cured at a low temperature, thereby capable of being applied to coating objects that are difficult in elevating temperature, or are thermally sensitive.

2. Description of the Related Art

Epoxy resin is a molecule having two or more epoxy functional groups. Epoxy resin is a kind of thermosetting resin irreversibly crosslinked to form a three-dimensional structure at room temperature or under the influence of heat. However, epoxy resins are different from other thermosetting resins in that curing is not carried out on heating in the absence of a catalyst or a curing agent. An epoxy resin is widely used in molded products, cast products, coatings and the like due to its excellent adhesion, mechanical property, electrical property, chemical resistance, etc.

In particular, the epoxy resin is excellent in adhesion, water resistance, and chemical resistance to various types of coating objects, including metals. Accordingly, the epoxy resin based coatings are widely used instead of alkyd resin or phenolic resin based coatings.

A powder coating composition is a coating film forming composition in the form of powder and does not use a volatile solvent such as an organic solvent or water. The powder coating composition is applied to a coating object and then heat-melted. The powder coating composition has advantages in that it does not use a solvent, can form a thick coating film with just one coating, and can use a high molecular weight resin which is not dissolved in a solvent, compared with a solvent-type coating composition. Accordingly, use and demand for the powder coating composition are increasing in fields of construction materials, automobile parts, pipes, mechanical parts, electronic products, iron furniture and the like.

The powder coating composition is generally produced as follows: a resin for a powder coating composition, a curing agent, a pigment and an additive, and the like are mixed in a blender. The mixture is placed into an extruder or a roll-mill, where it is heated at a temperature in a range of 80 to 130° C., melt-mixed and ground into a powder. Thereafter, a coating object is coated with the ground powder coating composition. Alternatively, the powder coating composition can be produced by mixing the above components in a mixer such as a ball-mill or a ribbon blender at room temperature.

The powder coating composition can be coated by various coating techniques, for example, a spray coating technique, a flow coating technique or an electrostatic coating technique. The electrostatic coating technique is most widely used.

Examples of the resin for the powder coating composition are an epoxy resin and a polyester resin. The epoxy resin is generally a bisphenol-A epoxy resin manufactured by reacting bisphenol-A and epichlorohydrin in the presence of a base or an acid. The bisphenol-A epoxy resin is excellent in chemical resistance and corrosion, resistance. However, because it is cured at a high temperature, for thick metallic coating objects that cannot reach an elevated temperature within a short time, a large amount of heat energy must be applied thereto, and thus energy use increases. Further, it is difficult to apply to coating objects that are thermally sensitive.

SUMMARY OF THE INVENTION

Therefore, the present invention has been made in view of the above problems, and it is an object of the present invention to provide a powder coating composition containing a low temperature curable epoxy resin with corrosion resistance.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
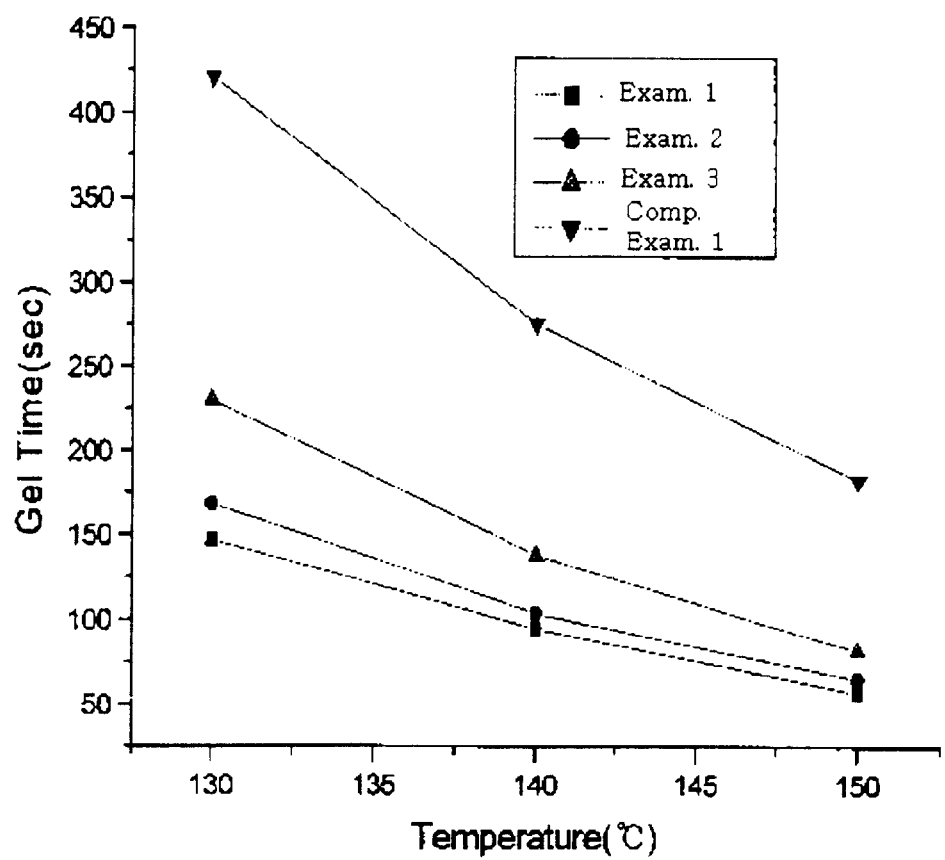
FIG. 1 is a graph showing gellation time of each of powder coating compositions obtained in the examples and the comparative example, upon a variation in temperature.

In accordance with the present invention, the above and other objects can be accomplished by the provision of a powder coating composition comprising 100 parts by weight of a low temperature curable epoxy resin represented by formula 1 below; 30 to 500 parts by weight of a curing agent; 0.1 to 20 parts by weight of a defoaming agent; and 0.1 to 20 parts by weight of a leveling agent.

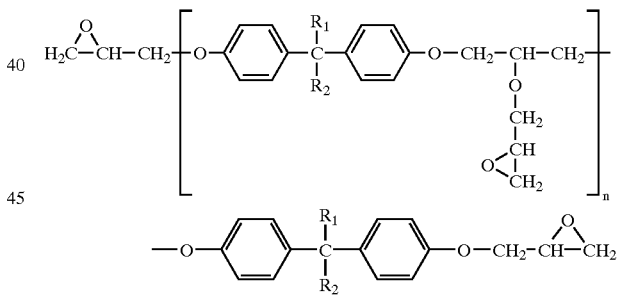

Formula 1 wherein, $R_1$ and $R_2$ are individually a hydrogen, a substituted or unsubstituted $C_1$–$C_5$ alkyl or alkoxy group, and n is an integer of 1 to 30.

It is preferred that $R_1$ and $R_2$ each are individually a hydrogen or a methyl group, and n is an integer of 1 to 15.

In accordance with one embodiment of the present invention, the curing agent is preferably a bisphenol-A curing agent or a polyester curing agent.

In accordance with another embodiment of the present invention, the powder coating composition preferably further comprises 10 to 200 parts by weight of a universal bisphenol-A epoxy resin for powder coating compositions (epoxy equivalent weight: 600 to 1500 g/eq) per 100 parts by weight of the low temperature curable epoxy resin of the formula 1.

In accordance with yet another embodiment of the present invention, the powder coating composition preferably further comprises one or more components selected from the group consisting of a pigment, an antioxidant, a filler, a light stabilizer, and a curing promoter.

Hereinafter, the present invention will be described in more detail.

A conventional epoxy resin is excellent in corrosion resistance but is generally cured at a high temperature. To improve this aspect, the low temperature curable epoxy resin of the formula 1 with multifunctional groups was used in the powder coating composition of the present invention. As a result, the epoxy resin of the present invention not only maintains corrosion resistance, but can also be cured at a low temperature.

The powder coating composition of the present invention comprises the multifunctional and low temperature curable epoxy resin of the formula 1 as its subject, and a bisphenol-A resin or a polyester resin as a curing agent. The reason why the bishphenol-A resin or the polyester resin is used instead of a conventional coating curing agent such as an acid anhydride or amine, is to cure the powder coating composition at a low temperature.

The amount of the bisphenol-A curing agent or the polyester curing agent to be used in the powder coating composition of the present invention is 30 to 500 parts by weight per 100 parts by weight of the multifunctional epoxy resin of the formula 1. This is to ensure the functional groups of the multifunctional epoxy resin completely react one-to-one with those of the curing agent, so as not to leave any epoxy resin functional groups unreacted.

As for the epoxy resin of the formula 1 contained in the powder coating composition of the present invention, it is preferred that an epoxy equivalent weight is 280 to 500, a weight average molecular weight is 500 to 4000, and a glass transition temperature is 40 to 100° C.

A polyester curing agent to be used in the powder coating composition of the present invention is that conventionally used in powder coating compositions in the pertinent art. The polyester curing agent is not particularly limited provided that it has carboxyl groups capable of participating in the curing reaction with the epoxy resin of the present invention. The polyester curing agent has preferably a glass transition temperature of 55 to 65° C. and an acid value of 30 to 80.

Examples of the polyester curing agent commercially available are trademark KP-3520 (KUKDO CHEMICAL Co., LTD, Korea), trademark KP-3531 (KUKDO CHEMICAL Co., LTD, Korea), trademark KP-3620 (KUKDO CHEMICAL Co., LTD, Korea), trademark KP-3720 (KUKDO CHEMICAL Co., LTD, Korea), and the like.

A bisphenol-A curing agent to be used in the powder coating composition of the present invention is that conventionally used in powder coating compositions in the pertinent art. The bisphenol-A curing agent has OH terminal groups and the equivalent weight of the OH groups is preferably 200 to 800.

Examples of the bisphenol-A curing agent commercially available are trademark KD-410J (KUKDO CHEMICAL Co., LTD, Korea), trademark KD-406 (KUKDO CHEMICAL Co., LTD, Korea), trademark KD-420 (KUKDO CHEMICAL Co., LTD, Korea), trademark KD-426 (KUKDO CHEMICAL Co., LTD, Korea), and the like.

The powder coating composition further comprises a universal bisphenol-A epoxy resin for powder coating compositions with an epoxy equivalent weight of 600 to 1500 g/eq. The universal bisphenol-A epoxy resin reacts with the bisphenol-A curing agent or the polyester curing agent upon the curing of the powder coating composition of the present invention. The universal bisphenol-A epoxy resin for powder coating compositions with an epoxy equivalent weight of 600 to 1500 g/eq is preferably added in an amount of 10 to 200 parts by weight per 100 parts by weight of the low temperature epoxy resin of the formula 1. If the added amount is less than 10 parts by weight, little effect is obtained, while if it exceeds 200 parts by weight, low temperature curability is lost and mechanical properties deteriorate.

The powder coating composition of the present invention preferably comprises a desired amount of a defoaming agent known in the pertinent art. The defoaming agent serves to control foams formed in the surface of a coating film. The content thereof is preferably 0.1 to 20 parts by weight based on the total weight of the composition. If the content is outside the above range, physical properties are adversely affected.

The leveling agent used in the powder coating composition imparts smoothness to a coating film. Its content is preferably 0.1 to 20 parts by weight. If the content is outside the above range, physical properties are adversely affected.

The powder coating composition can further comprise known additives conventionally added to powder coating compositions in the pertinent art. Examples of the additives are a pigment, an antioxidant, a filler, a light stabilizer, a curing promoter or a ultraviolet absorber, or the like.

The multifunctional low temperature curable epoxy resin of the formula 1 used in the present invention can be prepared by polymerizing a bisphenol-A epoxy resin of formula 2 below, and an epichlorohydrin.

Formula 2

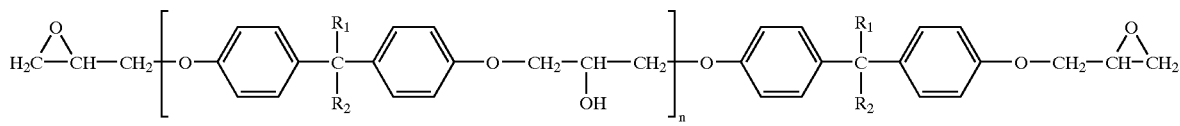

wherein, $R_1$ and $R_2$ are individually a hydrogen, a substituted or unsubstituted $C_1$–$C_5$ alkyl or alkoxy group, and n is an integer of 1 to 30.

The epichlorohydrin used to prepare the low temperature curable epoxy resin of the present invention is also referred to as 1,2-epoxy-3-chloropropane. It has the chemical structure of formula 3 below and is a colorless liquid. A DL-epichlorohydrin and a L-epichlorohydrin are known. The DL-epichlorohydrin is common.

Formula 3

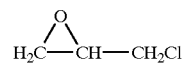

The multifunctional epoxy resin of the formula 1 of the present invention can be prepared by reacting the bisphenol-A epoxy resin of the formula 2 and the epichlorohydrin of the formula 3. The preparation method thereof is as illustrated in equation 1 below.

the formula 2 can also be prepared according to equation 2 below.

Equation 1

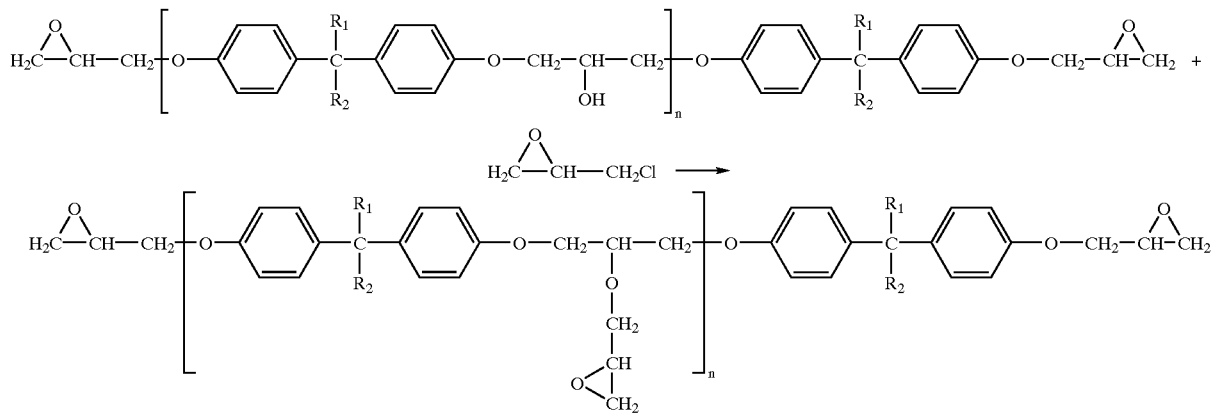

As shown in the equation 1, the multifunctional epoxy resin of the formula 1 can be obtained by reacting the Equation 2

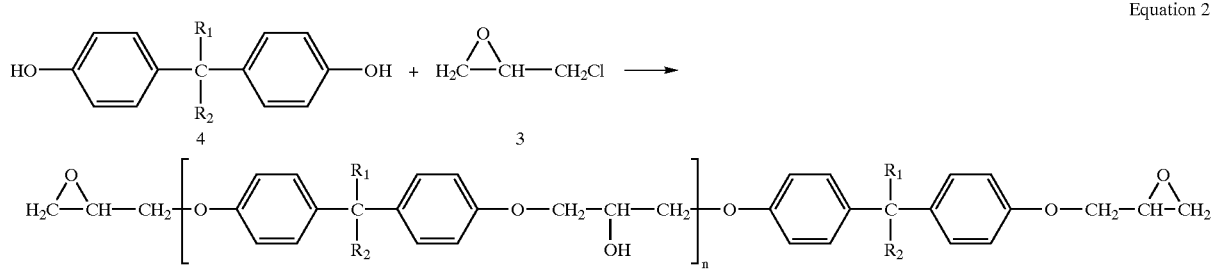

bisphenol-A epoxy resin of the formula 2 and an excess of the epichlorohydrin of the formula 3 in the presence of a catalyst.

The reaction is carried out in a range of 50 to 180° C. and under reduced pressure of 30 to 250 Torr.

The reaction time is 2 to 30 hours.

The catalyst used in the reaction may be any of conventional acidic or basic catalysts known in the pertinent art, but are not limited thereto. Preferably, NaOH, KOH and the like, alone or in a mixture of two or more thereof can be used.

After the completion of the reaction, unreacted epichlorohydrins are filtered and then removed. The resulting product is subjected to desalting and washing using a ketone solvent or purified water.

The multifunctional epoxy resin of the formula 1 obtained in above reaction has an epoxy equivalent weight of 200 to 600 and an n value of 1 to 30.

The epichlorohydrin of the formula 3 is preferably added in an excess amount relative to the bisphenol-A epoxy resin of the formula 2. The molar ratio of the bisphenol-A epoxy to the epichlorohydrin is 1:30 to 1:80.

The bisphenol-A epoxy resin of the formula 2 has preferably an epoxy equivalent weight of 400 to 2000, and more preferably an epoxy equivalent weight of 400 to 1000.

The bisphenol-A epoxy resin of the formula 2 can be selected among products commercially available, without being particularly limited. The bisphenol-A epoxy resin of wherein, $R_1$, $R_2$ and n are as defined in the formula 1.

As shown in the equation 2, the conventional bisphenol-A of the formula 4 and the epichlorohydrin of the formula 3 can react to form the bisphenol-A epoxy resin of the formula 2.

EXAMPLES

The invention will be described with reference to, but is not limited to, the following examples.

Reference Example 1

Preparation of Multifunctional Epoxy Resin 500 g of a bisphenol-A epoxy resin (epoxy equivalent weight: 700 g/eq) and 1300 g of an epichlorohydrin were reacted in the presence of NaOH as a catalyst at 60° C., under reduced pressure of 100 Torr, for 3 hours. After the completion of the reaction, unreacted epichlorohydrin was separated and then removed. The resultant was desalted with methyl isobutyl ketone and then washed with purified water to give a desired multifunctional epoxy resin.

Reference Example 2

Preparation of Multifunctional Epoxy Resin 500 g of a bisphenol-F epoxy resin (epoxy equivalent weight: 1000 g/eq) and 1300 g of an epichlorohydrin were reacted in the presence of KOH as a catalyst at 70° C., under reduced pressure of 100 Torr, for 3 hours. After the completion of the reaction, unreacted epichlorohydrin was separated and then removed. The resultant was desalted with methyl isobutyl ketone and then washed with purified water to give a desired multifunctional epoxy resin.

Example 1

Preparation of Powder Coating Composition

The multifunctional epoxy resin obtained in the reference example 1 was mixed with the components each having the composition shown in Table 1 below. The mixture was extruded with a heated extruder ZSK25 (W&P company, Main screw rpm: 250). The extrudate was ground into a fine powder. Then, the fine powder was applied onto the surface of a metal using GEMA electrostatic spray gun (60–80KV) to form a coating film. The metal having the powder coating film so formed was cured at 140° C.

Example 2

Preparation of Powder Coating Composition

A powder coating composition having the composition shown in Table 1 below was prepared in the same manner as described in the example 1 using the multifunctional epoxy resin obtained in the reference example 1.

Example 3

Preparation of Powder Coating Composition

A powder coating composition having the composition shown in Table 1 below was prepared in the same manner as described in the example 1 using the multifunctional epoxy resin obtained in the reference example 1.

Comparative Example 1

Preparation of Powder Coating Composition

A powder coating composition having the composition shown in Table 1 below was prepared in the same manner as described in the example 1.

TABLE 1

| Composition | Exam. 1 | Exam. 2 | Exam. 3 | Comparative exam. 1 |
|---|---|---|---|---|
| Epoxy resin of formula 1 ($R_1$, $R_2$ = methyl) | 95 | 64 | 49 | — |
| KD-242G | — | 43 | 67 | 140 |
| KP-3520 | 205 | 193 | 184 | 160 |
| Benzoin | 5 | 5 | 5 | 5 |
| PV5 | 5 | 5 | 5 | 5 |
| $BaSO_4$ | 50 | 50 | 50 | 50 |
| $TiO_2$ | 150 | 150 | 15 | 150 |
| 2-methyl imidazole | 0.5 | 0.5 | 0.5 | 0.5 |

All numeral values in Table 1 are expressed as part by weight.

In the composition of the Table 1, the trademark KD-242G (made by KUKDO CHEMICAL Co., LTD) is a universal bisphenol-A epoxy resin for powder coating compositions with an epoxy equivalent weight of 650–725 g/eq, and the trademark KP-3520 (made by KUKDO CHEMICAL Co., LTD) is a polyester resin for a powder coating composition as a curing agent.

The benzoin and the trademark PV5 (made by Wolee) were used as a defoaming agent and a leveling agent, respectively. The $BaSO_4$ as a filler, the $TiO_2$ as a pigment, and the 2-methyl imidazole as a curing promoter were used.

Experiment 1: Impact Test, Erichsen Test and Gellation Time Measurement

Impact test, Erichsen test and gellation time measurement were conducted for the examples 1–3 and comparative example 1. The results are shown in Table 2 below. The methods for the tests are as follows.

The Impact test was conducted according to ASTM D2794.

The Erichsen test was conducted according to ISO1520.

TABLE 2

Results of impact test and Erichsen test

| Test items | Curing time | Exam. 1 | Exam. 2 | Exam. 3 | Comparative exam. 1 |
|---|---|---|---|---|---|
| Impact test (Direct, 1 kg, 50 cm) | 130° C. × 20 minutes | Δ | ○ | Δ | X |
| | 140° C. × 15 minutes | ○ | ○ | ○ | X |
| | 150° C. × 10 minutes | ○ | ○ | ○ | X |
| Erichsen test (8 mm) | 130° C. × 20 minutes | ○ | ○ | ○ | X |
| | 140° C. × 15 minutes | ○ | ○ | ○ | X |
| | 150° C. × 10 minutes | ○ | ○ | ○ | X |
| Gellation time (sec) | 130° C. | 147 | 168 | 230 | 421 |
| | 140° C. | 95 | 104 | 138 | 275 |
| | 150° C. | 57 | 65 | 82 | 183 |

○: good, Δ: slight crack, X: crack

The gellation times for each of the examples 1–3 and comparative example 1 upon a variation in temperature are shown in FIG. 1.

As can be seen from the Table 2 and FIG. 1, the results of the impact test and Erichsen test show that the examples 1–3, which comprise the multifunctional epoxy resin of the present invention, are excellent in mechanical properties, compared with the comparative example 1, under the same curing condition.

As apparent from the above description, the powder coating composition comprising the multifunctional and low temperature curable epoxy resin of the present invention has excellent curability at a low temperature, thereby capable of being applied to thick metallic coating objects that cannot reach an elevated temperature within a short time, or coating objects that are thermally sensitive. Accordingly, the present invention is advantageous in terms of energy savings and environmental protection, because sufficient curing can be accomplished with a small amount of energy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A powder coating composition comprising 100 parts by weight of a low temperature curable epoxy resin represented by formula 1; 30 to 500 parts by weight of a curing agent; 0.1 to 20 parts by weight of a defoaming agent; and 0.1 to 20 parts by weight of a leveling agent, Formula 1

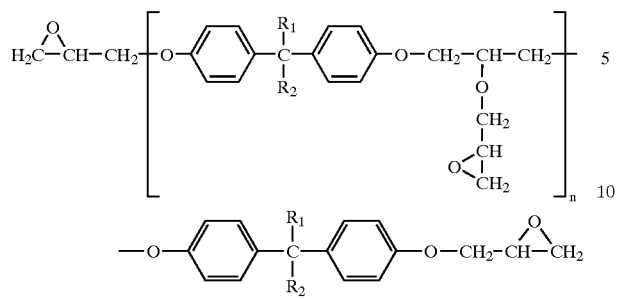

wherein, $R_1$ and $R_2$ are individually a hydrogen, a substituted or unsubstituted $C_1$–$C_5$ alkyl or alkoxy group, and n is an integer of 1 to 30.

2. The powder coating composition as set forth in claim 1, wherein $R_1$ and $R_2$ are a methyl group, and n is an integer of 1 to 15.

3. The powder coating composition as set forth in claim 1, wherein the curing agent is a bisphenol-A curing agent or a polyester curing agent.

4. The powder coating composition as set forth in claim 1, which further comprises 10 to 200 parts by weight of a universal bisphenol-A epoxy resin for powder coating compositions (epoxy equivalent weight: 600 to 1500 g/eq) per 100 parts by weight of the low temperature curable epoxy resin of the formula 1.

5. The powder coating composition as set forth in claim 1, which further comprises one or more components selected from the group consisting of a pigment, an antioxidant, a filler, a light stabilizer, and a curing promoter.

* * * * *